United States Patent [19]

Van Iperen

[11] Patent Number: 4,637,763

[45] Date of Patent: Jan. 20, 1987

[54] HANGING MULTI-DECK SYSTEM FOR STORING AND SHIPPING ARTICLES IN CONTAINERS

[75] Inventor: Willem H. P. Van Iperen, Westfield, N.J.

[73] Assignee: Sea-Land Corporation, Elizabeth, N.J.

[21] Appl. No.: 670,494

[22] Filed: Nov. 13, 1984

[51] Int. Cl.⁴ .................... B63B 25/18; B63B 25/24
[52] U.S. Cl. .................................. 410/52; 410/4; 410/54; 410/130; 410/140; 410/150; 105/370; 211/117; 211/187; 24/326; 16/93 R; 248/327
[58] Field of Search ........................ 410/2–4, 410/31, 54, 52, 66, 150, 152, 155, 156, 127, 129, 143, 130, 140; 248/228, 231.3, 231.5, 325, 327, 339, 340, 317; 52/479, 480; 105/370, 375; 104/224, 227; 211/186, 187, 113, 117, 118; 24/326, 328, 457, 563; 16/93 R, 93 D; 269/231, 236; 312/321; 108/149

[56] References Cited

U.S. PATENT DOCUMENTS

| | | | |
|---|---|---|---|
| 222,086 | 11/1879 | Slemmer | 248/231.3 X |
| 276,241 | 4/1883 | Hanavan | 248/340 |
| 630,900 | 8/1899 | Kohl | 269/231 X |
| 1,868,638 | 7/1932 | Mackey | 410/152 |
| 2,155,872 | 3/1937 | Reifer et al. | 410/150 |
| 2,165,652 | 7/1939 | Reifer et al. | 410/152 |
| 2,229,535 | 1/1941 | Weber et al. | 52/479 X |
| 2,466,728 | 4/1949 | Nampa | 410/150 |
| 2,546,929 | 3/1951 | Nampa | 410/147 |
| 2,780,850 | 2/1957 | Lieff | 24/326 X |
| 2,977,899 | 4/1961 | Doherty et al. | 410/149 |
| 3,118,545 | 1/1964 | Rosner | 211/117 |
| 3,180,460 | 4/1965 | Liskey, Jr. | 52/479 |
| 3,183,855 | 5/1965 | Adler | 410/143 X |
| 3,662,509 | 5/1972 | Studzinski | 52/479 X |
| 3,798,710 | 3/1974 | Tinnerman | 24/457 |
| 3,900,110 | 8/1975 | Soroka | 211/113 |
| 4,256,425 | 3/1981 | Burgess et al. | 410/150 X |
| 4,343,401 | 8/1982 | Paulyson | 105/375 X |

FOREIGN PATENT DOCUMENTS 0563608 6/1957 Italy .

Primary Examiner—Robert B. Reeves
Assistant Examiner—Scott H. Werny
Attorney, Agent, or Firm—Scully, Scott, Murphy & Presser

[57] ABSTRACT

Fixtures supportable in a containerized unit for compartmentalizing the container into predetermined areas for storage and shipment of non-stackable articles at one or more levels within the container. A series of vertical support hangers are releasably connected to a longitudinally-extending horizontal top ledge within the container at opposite sides at predetermined spaced longitudinal intervals such that all the vertical load is supported by the ledge. Each of the vertical support hangers is provided with a releasable ledge-engaging C-clamp for gripping the ledge and a series of vertically-spaced pairs of slots for supporting horizontal support beams at predetermined levels by opposite vertical support hangers. Beam supporting connectors are positioned to support planar decking on the horizontal support beams at predetermined levels for compartmentalizing the interior of the container depending upon the article to be stored and shipped. Additional vertical hangers are placed over a link member of the corner support to prevent the link member from coming off the top rail and also to provide extra support for cargo in conjunction with support rails and the opposite side vertical hanger. The shape and cross-section of the corner supports are such that only limited column support can be obtained from the corner support, hence, the additional vertical hangers at the beginning and the end of the container. The various fixtures: corner support members, vertical support hangers, horizontal support beams and planar decking, may be readily disassembled and repeatedly reusable permitting container use devoid of any fixtures.

15 Claims, 23 Drawing Figures

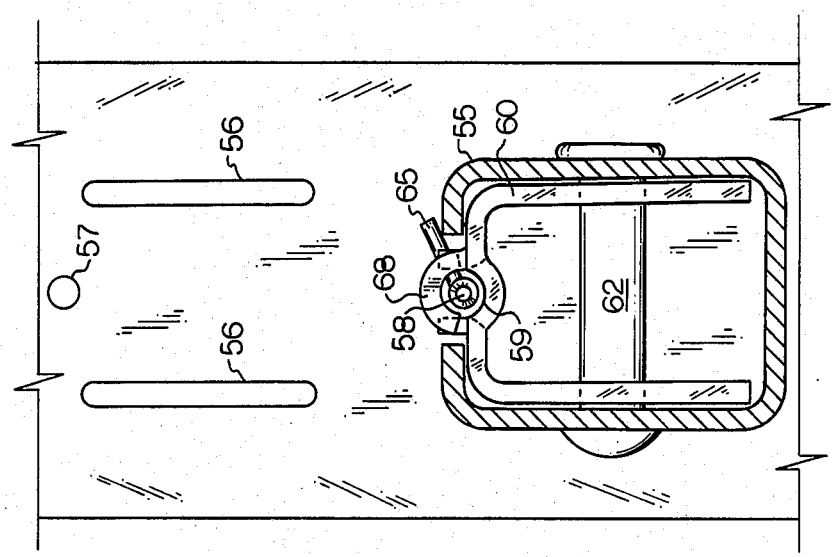
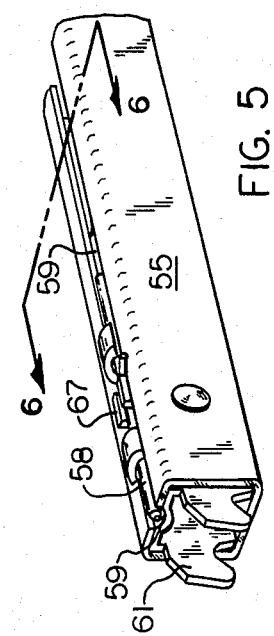
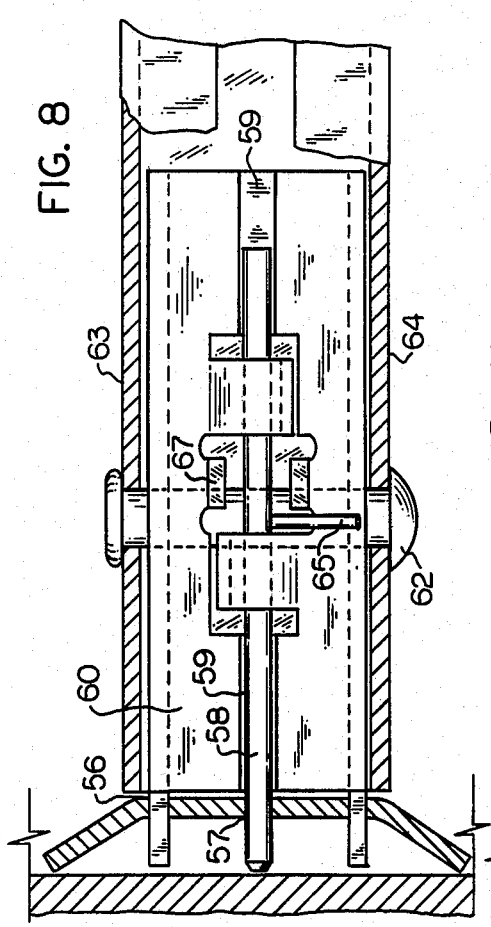
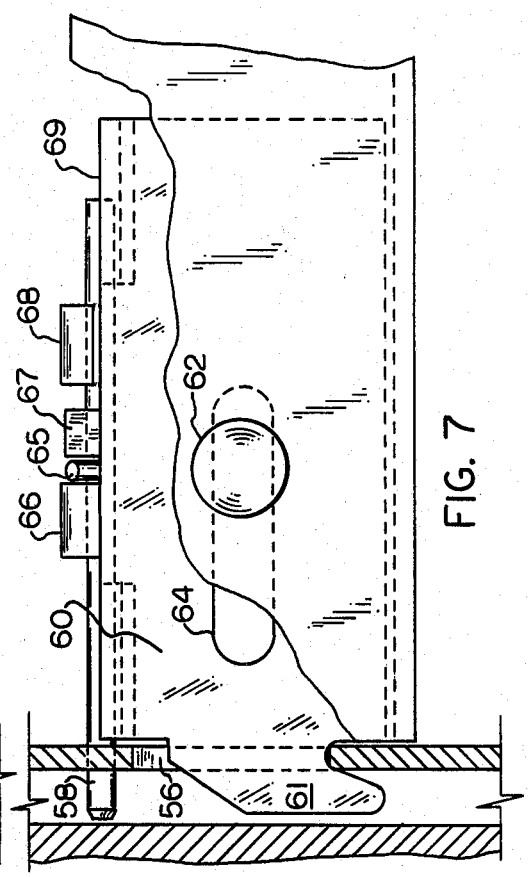

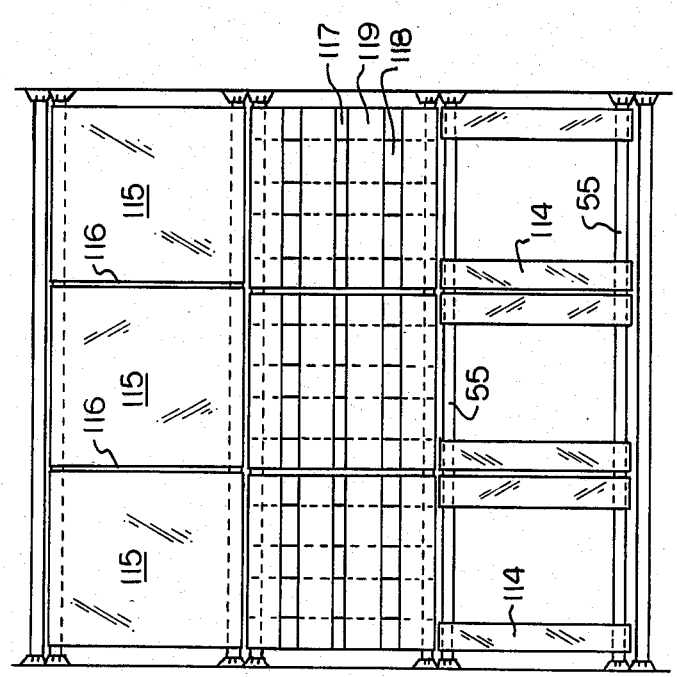
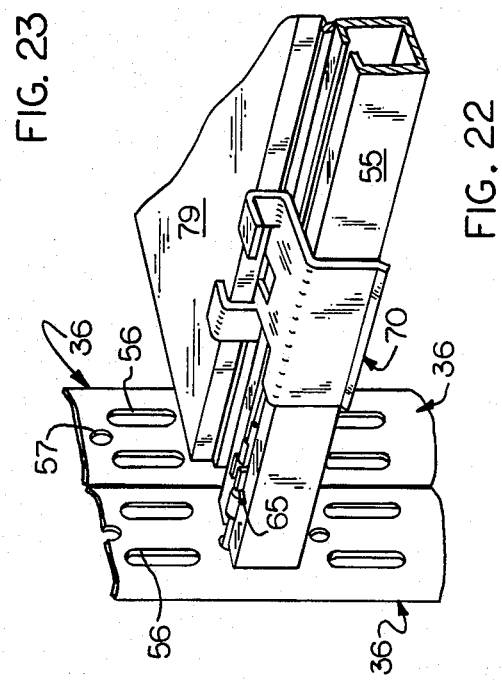
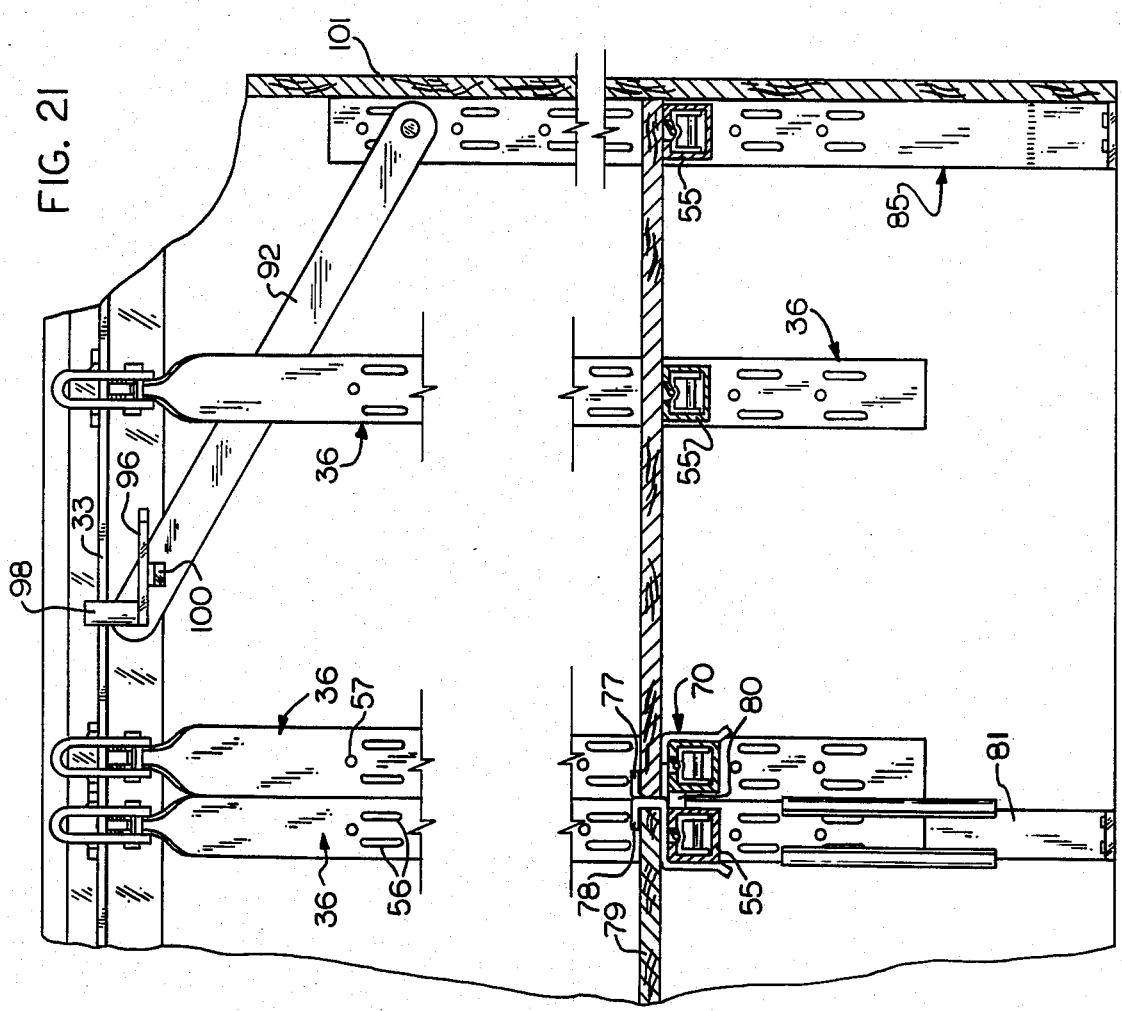

HANGING MULTI-DECK SYSTEM FOR STORING AND SHIPPING ARTICLES IN CONTAINERS

BACKGROUND OF THE INVENTION

1. Field of the Invention

The present invention relates generally to material storage, handling and shipping art, and specifically relates to fixtures for removable installation in intermodal cargo containers and other storage facilities for supporting and compartmentalizing a wide variety of articles.

2. Description of the Prior Art

Various types of fixtures have been utilized in containers for hanging and shipping various articles as shown in U.S. Pat. Nos. 1,793,035 and 2,262,085. Cargo bracing fixtures have also been employed in freight vehicles for storage of articles as shown in U.S. Pat. No. 2,354,861.

Compartmentalization of movable containers to store and ship articles is illustrated in U.S. Pat. Nos. 2,466,728; and 2,467,681 which are illustrative only. Load bracing fixtures for vehicles as well as storage facilities are illustrated in U.S. Pat. Nos. 2,977,899; 3,051,099 and 3,115,102. Fixtures for bracing panels in a structural support is illustrated in U.S. Pat. Nos. 3,174,592; 3,306,465; 3,352,595, among others. Hanger bars for shipping garments are also well known as illustrated in U.S. Pat. Nos. 3,773,184; 3,800,960; 3,836,174; 4,033,268, among others. Shipping bulkheads are also the subject of numerous patents including U.S. Pat. Nos. 4,080,906; 4,094,546 and 4,281,870.

The compartmentalization of areas of a shipping container and multi-deck separation to carry non-stackable cargo for attaining maximum cargo loadability, storage and shipment in a flexible system whether for skid or pallet mounted cargo has not been utilized optimally in view of the paucity of fixtures capable of ease of installation and removal within a cargo container of the type used for container vehicles or dry vans.

The ease or difficulty of installing fixtures within existing container units without major modifications to the structure has been prohibitively costly for multiple use container units to obtain maximum utilization. Permanently installing fixtures for various types, weights and loads of cargo leads to difficulties particularly when overseas shipments are made to derive maximum revenue for the particular containerized unit which may necessitate one type of compartmentalization for one-way shipment of certain articles and disassembly of the entire interior of the containerized unit for return shipment of entirely different cargo without disposing of the fixtures which may be reused readily for a multitude of other configurations within a containerized unit depending upon the size, weight and distribution of the particular articles.

Additionally, many different types of articles may be used within a container utilizing the fixtures of the present invention in which the compartmentalized areas may be at different levels to accommodate a wide variety and assortment of articles with maximum ease of installation and disassembly.

SUMMARY OF THE INVENTION

The present invention is for a system including individual fixtures for releasable installation in a containerized unit for loading, storing and shipping a multiplicity of articles in compartmentalized and segregated zones or areas and at different levels depending upon the volume and weight of the individual articles.

The system includes a series of removable vertical support hangers that are spaced at selected longitudinal intervals in a cargo container in combination with a series of horizontal support rails for subdividing the vertical space within the container. Suitable decking and partitions may be supported by the supporting rails and hangers at predetermined levels and longitudinally of the container to provide individual storage areas depending upon the volume required by the individual articles to be supported, stored and shipped. The individual compartmentalized container utilizing the present system utilizing the various fixtures may be readily disassembled and removed from the container after it has been evacuated of all articles and the container may be used for shipment of bulk cargo which does not require compartmentalization.

DESCRIPTION OF THE DRAWINGS

FIG. 5 is a partial perspective view of a removable horizontal support rail for connection to a vertical hanger;

FIG. 6 is an enlarged transverse view taken along line 6—6 of FIG. 5 of the support rail mounted to a section of the support hanger;

FIG. 7 is a partial side view of FIG. 6 with portions removed illustrating the interconnection between the support rail and the support hanger in position;

FIG. 8 is a partial top plan view of FIG. 7;

FIG. 9 is a plan view of the locking pin of the support rail shown in FIGS. 5-8;

FIG. 21 is a partial interior longitudinal view, with portions removed, of a series of vertical hangers, support rails, partitions and an auxiliary end supporting hanger within one end and side of a cargo container;

FIG. 22 is a partial perspective view of sections of a vertical hanger, a support rail, a partition supporting member mounted on the support rail and a partial partition joined together; and FIG. 23 is a partial modified plan view of an area for storage within a cargo container for segregating cargo units.

DETAILED DESCRIPTION OF PREFERRED EMBODIMENTS OF THE INVENTION

Figure 2:
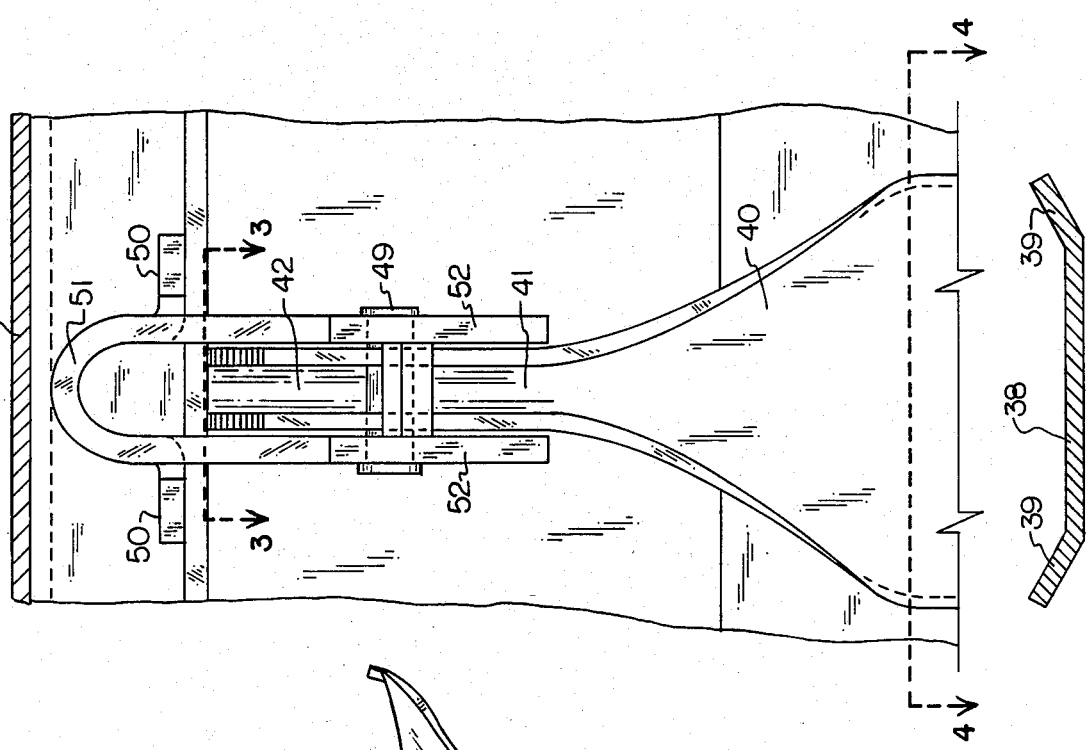
FIG. 2 is a right end view of FIG. 1.
Figure 4:
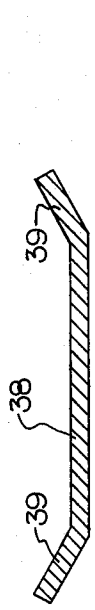
FIG. 4 is a transverse view of the hanger taken substantially along line 4—4 of FIG. 2.

Referring to FIGS. 1-4 and 21, there is illustrated the upper portion of a modular and stackable intermodal cargo container 25 in which the roof panel 26 extends throughout the overall length and width of the container beneath which an overhead extrusion 27 extends longitudinally of the container and is provided with an outwardly extending web 28 on which the roof panel 26 is secured. A longitudinally extending outwardly protruding channel 29 is integrally formed in the extrusion 27 which is also provided with a vertically depending leg 30 against which the container side 31 is secured at the upper section through the vertical slot 32 to provide a waterproof upper section. Extrusion 27 includes a longitudinally protruding ledge 33 having an upper surface 34 and a lower surface 35.

Figure 3:
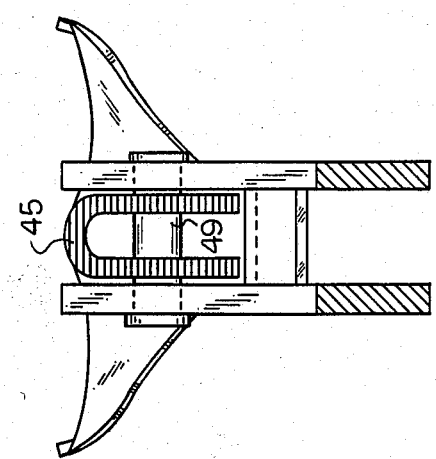
FIG. 3 is a view taken substantially along line 3—3 of FIG. 2.
Figure 1:
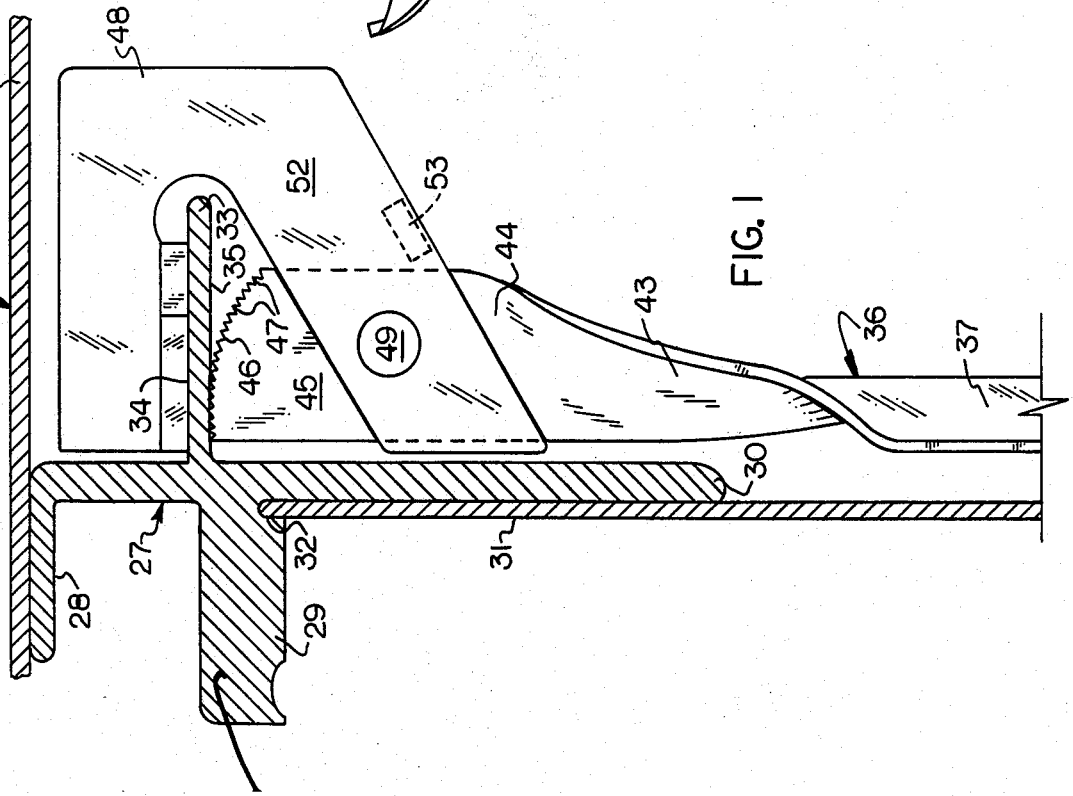
FIG. 1 is a partial side view of a hanger positioned on the header extrusion mounted within a cargo container, only a portion of the roof and sidewall being shown.
Figure 12:
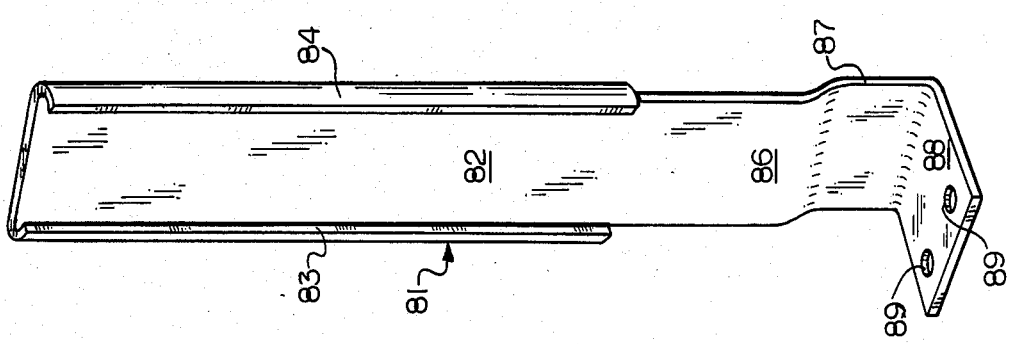
FIG. 12 is an extension leg for a supporting hanger.

The vertical releasable support hanger 36 is a primary fixture in the system and consists of a vertical strut 37 having a medial web 38 that extends longitudinally for a substantial length of each strut member 37 with flared longitudinally extending side web members 39. The upper section 40 of each strut 37 converges upwardly as shown in FIG. 2 to form the neck section 41 in which the body of the strut including the side web members 39 are flattened to form a relatively narrow channel 42 between the projecting legs or extending webs 43 at the head section 44 of the support hanger 36. The head end 45 of the support hanger has a U-shaped cross-section as shown in FIG. 3 and is provided with an arcuate serrated ledge-gripping end 46 in which serrated section has a plurality of teeth that will bite into the lower ledge portion 35 to retain the support hanger in position in conjunction with the cooperating pivotable C-clamp member 48 which is pivotally connected to the pivot pin 49 which extends through the U-shaped medial section 45. The C-clamp member 48 has an upper claw section 51 from which laterally extending shoulder members 50 project to engage and rest upon the upper surface 34 of ledge 33. The upwardly extending loop 51 of the C-clamp suitably spaces the shoulder members 50 a suitable distance apart and straddles the support hanger upper section 44 by the depending legs which are restrained by the pivot pin 49 extending therethrough Lug 53 secured to the inner surface of one of the legs 52 will limit displacement of the C-clamp 48 relative to the upper section 44 of the support hanger Installation of each of the support hangers 36 is performed manually by positioning the C-clamp 48 over the horizontally projecting ledge 33 with the support hanger 36 being pivoted about pivot pin 49 in a counterclockwise direction opening the gap between the shoulder members 50 and the arcuate section 46 and teeth 47 to permit cooperative reception of the ledge 33 therebetween. Upon full entry of the ledge 33 and bottoming of the C-clamp and the pivot lock or arcuate serrated section 46, the support hanger bottom portion may then be pivoted in a clockwise direction, in FIG. 1, to have the teeth 47 bite into the bottom surface 35 of ledge 33 thereby clamping the support hanger 36 in position against slippage and lateral displacement. The positioning of a plurality of support hangers throughout the container may occur in a predetermined selected arrangement depending upon the particular cargo articles to be stored. In those applications in which multiple levels are desirable within the container, support beams or rails 55 may be interlocked into vertically spaced pairs of slots 56 that are formed in vertically spaced relation on each of the support hangers as shown in FIGS. 7, 8, 21 and 22. Additionally, each of the support hangers is provided with a security latch opening in spaced relation to the elongated slot openings 56 for cooperatively receiving and retaining therein a removable security latch 58 that is slidably mounted in the longitudinal indentation 59 in each of the end sections 60 of the support rails or beams 55 as shown in FIGS. 5-8. Each end of the support rails is provided with a pair of laterally-spaced downwardly projecting slidable hook members 61 which are guidably retained for displacement by the rivet members 62 which extend through opposing sidewalls 63 and 64 in the support rail 55 and extend through elongated slots 64 in the slidin9 hooks 61. A latch nandle 65 secured to the security latch will permit the displacement of the security latch 58 longitudinally of the locking lug members 66, and 68 which are spaced from each other on the upper section 69 of the supporting beam 55. Projection of the latch 58 into the support hanger opening 57 may be facilitated by displacement of the latch handle 65 and then rotating it between the lugs 66 and 67. Removal or withdrawal of the latch 58 from the opening 57, as shown in FIG. 7, will occur upon rotation of latch handle 65 and displacement of it to the right.

The horizontal support rails or beams 55 which have the sliding hook members 61 are interlocked with the vertical support hangers 37 in position by retracting the latch handle 65 with the security latch 58 and inserting the sliding hooks 61 in each of the supporting rails 55 into the spaced elongated slots 56 in a vertical support hanger 37 and then projecting the security latch 58 into the security latch opening 57 in the support hanger. Each end of the support rail 55 may be positioned similarly in a cooperating and aligned support hanger at the desired location and elevation as illustrated in FIGS. 7, 8, 19, 20, 21 and 22.

Figure 11:
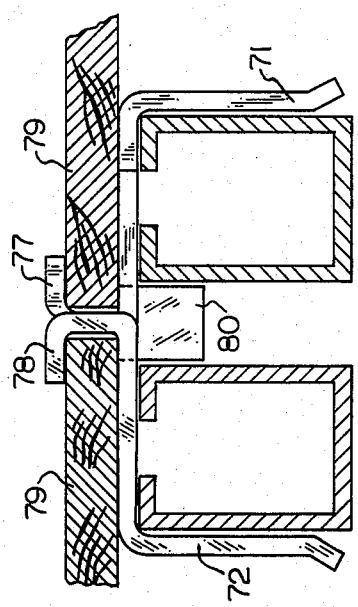
FIG. 11 is an end view of FIG. 10 with portions of a partition supported therein.
Figure 13:
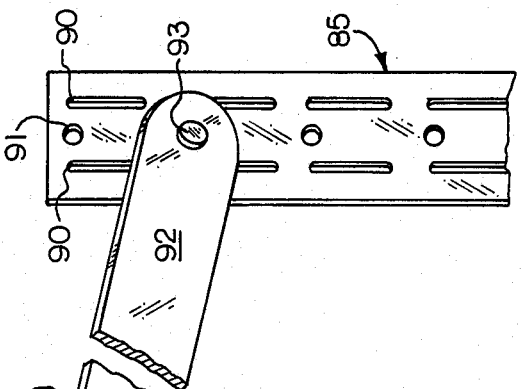
FIG. 13 is an auxiliary end supporting hanger with an intermediate portion removed.
Figure 10:
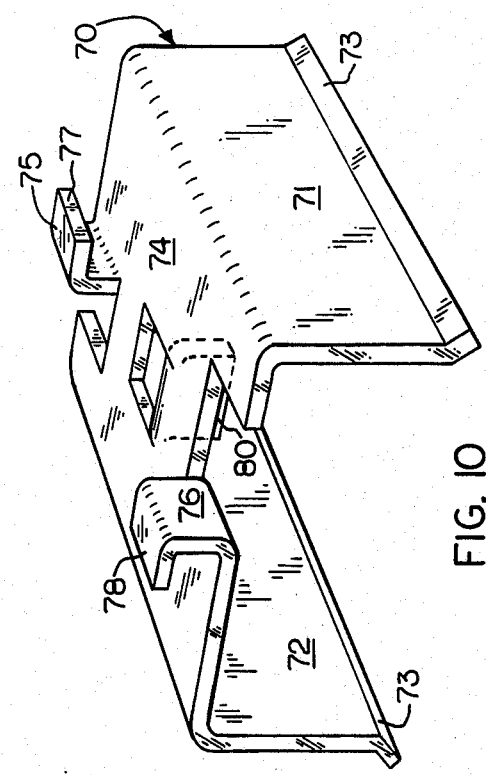
FIG. 10 is a perspective view of a partition supporting member.
Figure 14:
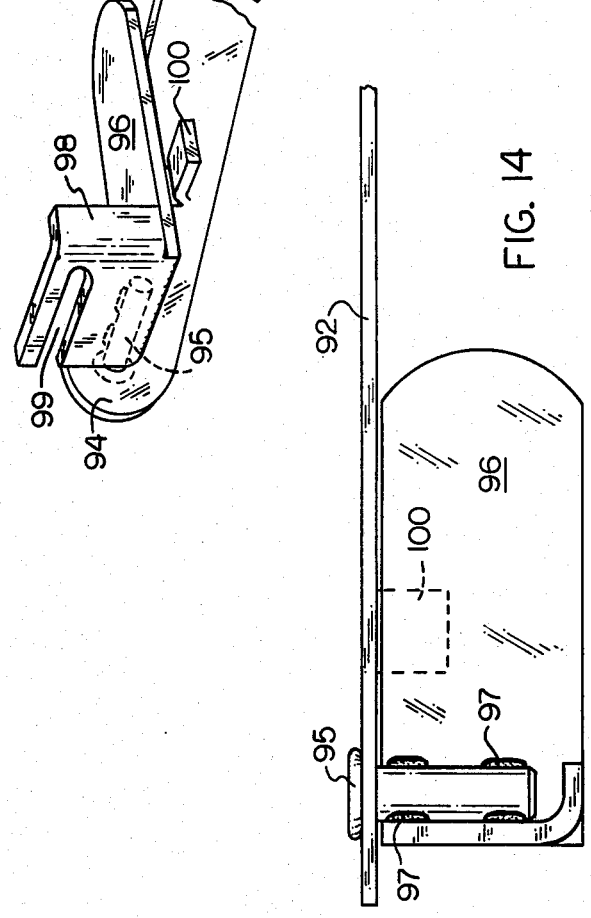
FIG. 14 is a top plan view of the left end of the auxiliary end supporting hanger of FIG. 13.

Upon installation of the vertical support hangers 36 and the interconnecting support beams or rails 55 therewith, a partition supporting member or connector plate 70 may be positioned over an adjacent pair of supporting beams 55 as shown in FIGS. 21 and 22 in which each of the connector plates 70 is provided with laterally spaced depending legs 71 and 72 that have end flared portions 73 to faciliate installation over the pair of supporting beams 55. The top section 74 of each connector plate 70 has upwardly extending rightangle lug members 75 and 76 in which each has an oppositely directed partition or deck retaining lip 77 and 78 to maintain plywood decking or panels 79 in position as shown in FIG. 11. Depending lug 80 will extend between an adjacent pair of supporting beams 55 to space them apart as shown in FIG. 21. One or more connector plates or partition supporting members 70 may be mounted at spaced intervals on a pair of support or horizontal support rails 55 depending upon the articles to be supported on the decking 79.

Referring to FIGS. 12-14 and 21, there is illustrated an extension or support leg 81 having a central web 82 with inwardly flared sides 83 and 84 for cooperatively receiving the lower section of a vertical support hanger therein, where desirable. The lower end 86 of the extension leg 81 is bowed outwardly at the lower extremity 87 with the terminal end 88 forming a flanged foot to support the extension leg with a vertical support hanger to the floor of a container through fastening means passed through the foot openings 89.

The corner support 85 is a flat longitudinally extending member with pairs of laterally spaced elongated slots 90 and security latch openings 91 therein for cooperatively receiving and supporting a rail 55 with the sliding hook 61 and security latch 58 therein. The corner support is provided with a pivotable link 92 that is mounted to the corner support 85 by means of the pivot rivet 93 at one end of link 92 with the other link end 94 being provided with a pivotable stud 95 for supporting a top rail bracket member 96, through the weld 97, which member 96 has an upwardly extending ledge-receiving arm 98 in which there is an elongated open slot 99 for cooperatively receiving the ledge 33 therein. A limit lug 100 is provided intermediate the length of link 92 limiting displacement of the top ledge bracket 96 which is shown in the installed position in FIG. 21.

There is shown in FIG. 21 a portion of an installation of the various fixtures at one end of a container unit in which the end wall 101 has a first vertical support 85 mounted against it with a second angled link 92 extending upwardly at an angle for connection of the top rail bracket 98 with the ledge 33 and the bracket member 96 positioned horizontally against the limit lug 100 with the link 92 positioned rearwardly of the vertical support hanger 36. Rail member 55 is mounted on the corner support 85 and will support a deck portion 79 thereon which deck portion 79 extends laterally over the rail 55 on the vertical support hanger 36 next adjacent to corner support 85. A pair of vertical support hangers 36 is positioned at a select spaced interval from the first vertical support hanger 36 depending upon the required load support constraints. One of the vertical support hangers 36 is provided with an extension leg 81.

Figure 18:
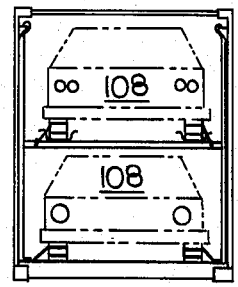
FIG. 18 is a right end view of FIG. 16.
Figure 17:
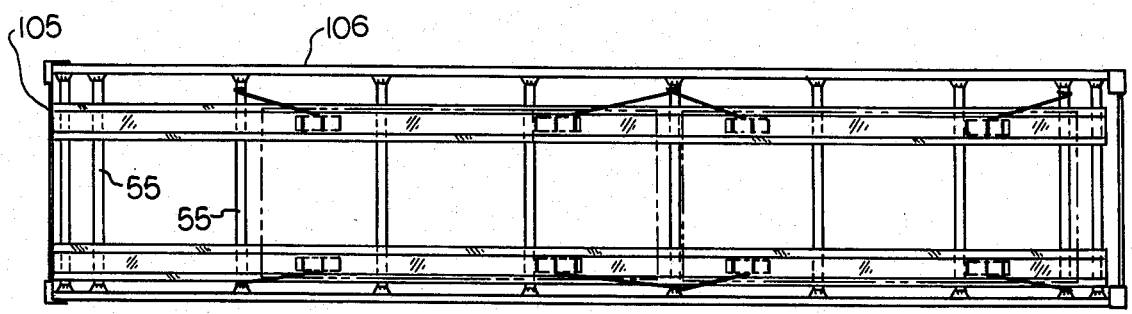
FIG. 17 is a plan view of FIG. 16 with the container roof removed.
Figure 16:
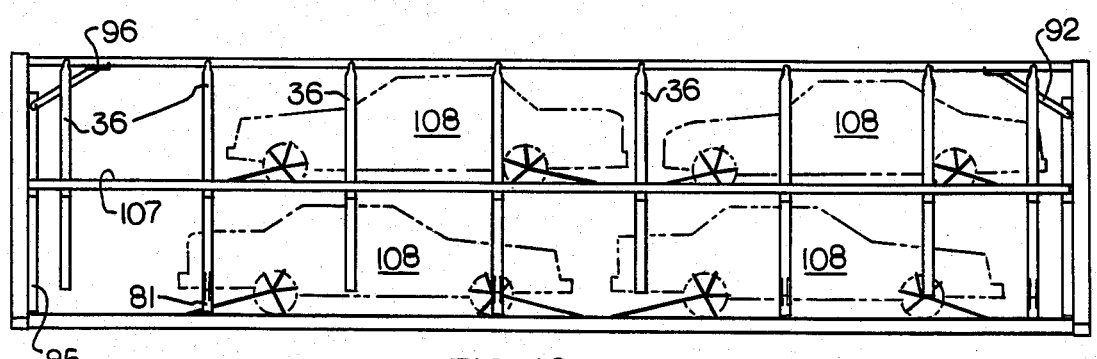
FIG. 16 is a schematic longitudinal end view of a container utilizing the support hangers to which the support rails are connected and floor partitions are mounted intermediate the height of the container to support vehicles within the container at two levels.

There is illustrated in FIGS. 16-18 one mode for installing the various fixtures in a container unit 105 in which longitudinallyspaced hangers are connected to the side of the container 105 and support rails 55 extend transversely to the support hangers 36 intermediate their vertical heights to support a series of deck sections 107 throughout the container length over the support rails 55 thereby providing a multi-deck container for receiving, storing and shipping motor vehicles within the container at the two levels.

Figure 15:
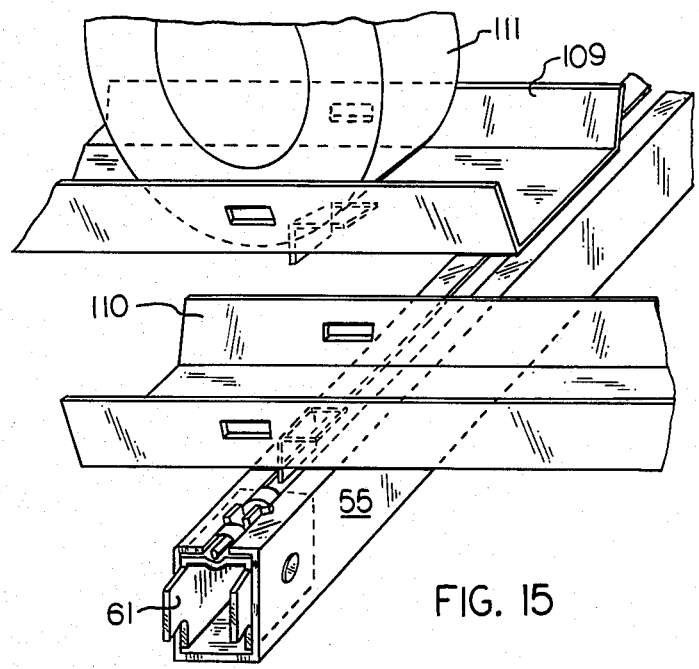
FIG. 15 is a partial schematic perspective view of a support rail on which a pair of vehicle tracks are mounted with one of the tracks supporting a wheel portion thereon.

As shown in FIG. 15, support rail 55 may also support U-shaped longitudinally-extending wheel tracks 109 and 110 at an appropriate lateral spacing to support vehicle wheels 111, only one of which is shown in FIG. 15.

Figure 19:
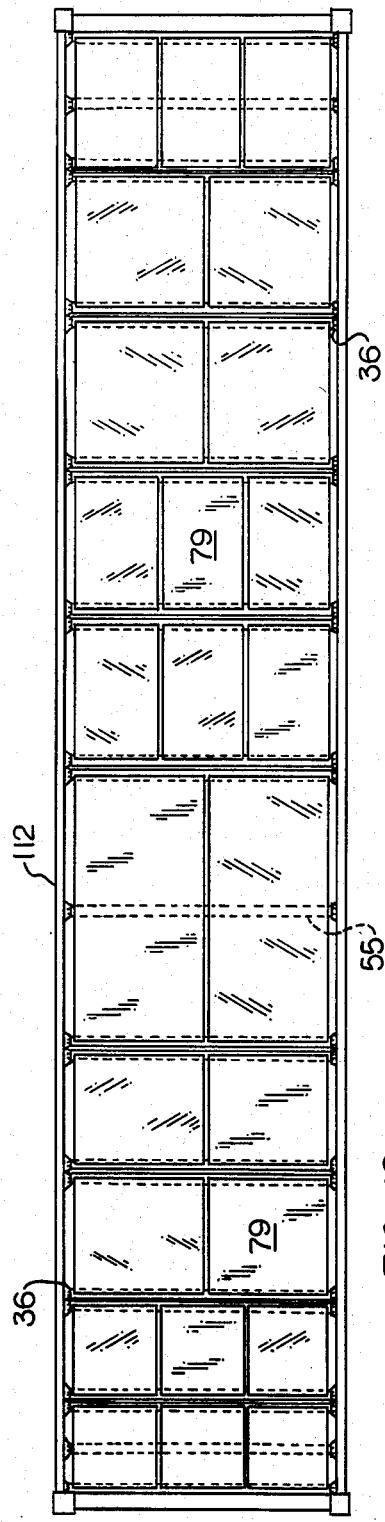
FIG. 19 is a schematic plan view of a container divided into sections illustrating multiple storage areas within the container divided by the support rail.
Figure 20:
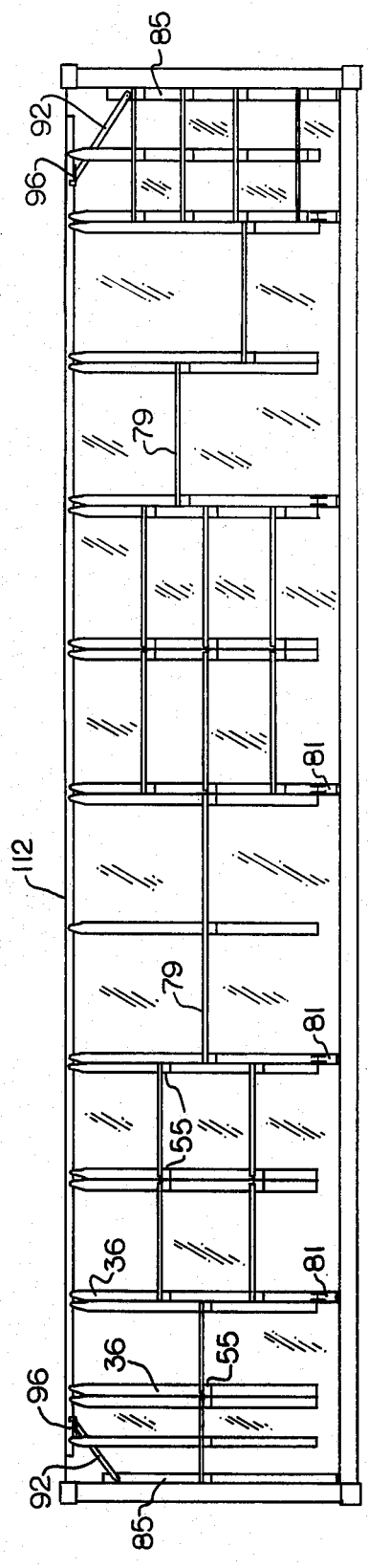
FIG. 20 is a schematic side view of FIG. 19.

There is shown in FIGS. 19 and 20 a container unit for transshipment of a multiplicity of articles in which the container is provided with the fixtures of the present invention in which the support hangers 36 are longitudinally spaced from each other and the corner supports 85 are positioned at each end of the container unit. The various support rails or beams 55 are interspersed throughout the container at various levels to provide support for the deck sections 79 thereby providing compartmentalized areas depending upon the various article volumes to be stored and shipped.

Similarly, in FIG. 23, a partial modified plan view for storage within a container is shown for individual cardboard containers or boxes segregating articles of various types within a section of a container in which a skid or pallet 114 supports a containerized article. Another section 115 has a relatively open area for tall objects which may be separated by partitioning member 116 to limit article movement within each of the sections 115. In the intermediate portion 117, lower level slats 118 extend longitudinally for supporting smaller articles below the upper slats 119 which will then provide support for another level for storage.

The wide variety of combinations that may be used will depend upon the weight, distribution and volume required within the container.

The process of determining the positioning of the various fixtures and decking, the arrangement will depend upon the various types of articles to be loaded and forklift trucks and other material handling devices may be used to position the articles within the container at the various levels with the fabrication commencing from one end to the other of the container as the articles are installed. Upon removal of the articles at one end of the container, the various fixtures and decking may be removed to provide ready access for removal of articles in each area sequentially. The various fixtures and decking may be suitably stored after disassembly and reshipment for reuse in other containers of the same or similar type with the various fixtures and decking being reusable.

It will be readily apparent to those skilled in the art that various combinations may be utilized with the fixtures of this invention depending upon the particular articles and equipment to be loaded and shipped.

I claim:

1. A modular and stackable cargo container having a removable multi-deck system for transportation of non-stackable cargo, said container comprising;
   (a) a floor, corner posts, a roof, side walls, and at least one door to define an enclosed container,
   (b) a pair of overhead extrusions adjacent, paid roof, extending between said corner posts for supporting a pair of inwardly extending longitudinal ledges and said roof,
   (c) a plurality of removable vertical support hangers, each hanger having a first and second end, with the first end of each hanger having a releasable ledge engaging means for gripping and releasably engaging said horizontal ledge to thereby suspend any load carried by the hanger from the horizontal ledge only, said second end hanging freely,
   (d) at least one horizontal support beam extending between a pair of opposing, removable vertical hangers and secured thereto, with a single hanger adjacent each opposing side wall,
   whereby said removable hangers and support beams may be and adjustably spaced along the longitudinal and vertical dimensions of said container, and quickly and easily removed to allow the entire cross-section of the container to be filled with bulk goods.

2. A cargo container as claimed in claim 1, wherein said container further includes a corner support member positioned in said container at one end thereof in juxtaposition to said vertical support hanger.

3. A cargo container as claimed in claim 1, wherein said container further includes at least one extension leg cooperatively engaging said vertical support hanger for retaining said second free end to prevent longitudinal displacement of said free end.

4. A cargo container as claimed in claim 1, wherein said container further includes at least one connector plate means releasably mountable on said horizontal support beam for retaining a planar surface on said beam.

5. A cargo container as claimed in claim 1, wherein said releasable ledge-engaging means includes a C-shaped member for engaging said ledge, and means on said C-shaped member for pivotally supporting said vertical support hanger therefrom, said support hanger having an arcuate end, said arcuate end having a series of serrated teeth for engaging and locking said vertical support hanger in position, said vertical support hanger having a plurality of vertically spaced-apart pairs of hook-engaging openings.

6. A cargo container as claimed in claim 5, wherein said horizontal support beams further include displaceable and lockable hook members for cooperative engagement with said hook-engaging means in said vertical support hanger.

7. A removable multi-deck system for shipping non-stackable cargo in standardized intermodal containers, said containers having a floor, corner posts, and a pair of overhead extrusions extending between said corner posts, said extrusions having a pair of inwardly extending longitudinal ledges adjacent a roof, said system comprising;
   (a) a plurality of removable vertical support hangers, each hanger having a first and a second end,
   (b) the first end of each hanger having a releasable ledge engaging means for gripping the inwardly extending ledge adjacent the roof of the intermodal container,
   (c) the second end hanging freely to thereby suspend all of the load carried by the hanger from the horizontal ledge of the extrusion,
   (d) a plurality of horizontal support means extending between opposing pairs of removable vertical hangers and secured thereto, to thereby provide horizontal support for non-stackable cargo,
whereby said removable hangers and support means may be adjustably spaced along the longitudinal and vertical dimensions of the container, and quickly and easily removed to allow the entire cross-section of the container to be filled with bulk goods.

8. A removable multi-deck system as claimed in claim 7, which further includes a pair of floor mounted corner support members at one end of said container, each of said corner members having a first vertical section, with a second angled section connecting said vertical section with its associated horizontal ledge.

9. A removable multi-deck system as claimed in claim 7, which further includes at least one floor mounted extension leg for slidingly receiving the second end of the vertical hanger to thereby prevent longitudinal displacement of said second free end.

10. A removable multi-deck system as claimed in claim 7, which further includes connector means which may be releasably mounted on said horizontal beam to retain a horizontal planar surface that is supported by said beam.

11. A removable multi-deck system as claimed in claim 10, wherein said connector means is adapted to releasably secure two horizontal bemas to one another when the respective vertical hangers are mounted adjacent one another.

12. A removable multi-deck system as claimed in claim 7, wherein said system further includes:
   (a) at least two pairs of vertical hangers, with one hanger from each pair mounted on opposing side walls of said container,
   (b) at least two horizontal beams mounted between each pair of vertical hangers,
   (c) a vertical partitioning member positioned between and secured by said horizontal beams to thereby define a vertical bulkhead for said container.

13. A removable multi-deck system as claimed in claim 7, wherein said releasable ledge engaging means includes a C-shaped member for engaging said ledge, and means on said C-shaped member for pivotally supporting said vertical support hangers therefrom, said support hangers having an arcuate end, said arcuate end having a series of serrated teeth for engaging and locking said vertical support member in position.

14. A removable multi-deck system as claimed in claim 7, wherein each of the vertical hangers includes a plurality of slots to provide for adjustable spacing of said horizontal support beams, with each beam having a fixed slot engaging means for transferring vertical loads to said vertical hanger, and a second reciprocal means for engaging said hanger and preventing vertical motion of the beam with respect thereto.

15. A removable multi-deck system as claimed in claim 7, wherein said system includes:
   (a) a series of said vertical support hangers gripping said horizontal ledge at preselected and spaced intervals along each of said horizontal ledges on opposite side walls of said container,
   (b) a plurality of horizontal support beams, each beam having opposite ends, each beam releasably secured to a vertical hanger at each of its opposite ends,
   (c) a plurality of connector means, said means releasably secured to said horizontal beams,
   (d) a planar decking positioned on said support beams and secured by said connector means,
wherein said system may form predetermined areas for storage and shipment of articles of various weights, sizes, and volume, at one or more levels within a container.

* * * * *